March 9, 1926.　　　　　　　F. A. VEITH　　　　　　　1,575,878
DRILL DEVICE
Filed Jan. 31, 1921

Inventor:-
Frank A. Veith
By
Attorney

Patented Mar. 9, 1926.

1,575,878

UNITED STATES PATENT OFFICE.

FRANK A. VEITH, OF ERIE, PENNSYLVANIA, ASSIGNOR TO TITAN TOOL COMPANY, OF ERIE, PENNSYLVANIA, A CORPORATION OF PENNSYLVANIA.

DRILL DEVICE.

Application filed January 31, 1921. Serial No. 441,233.

*To all whom it may concern:*

Be it known that I, FRANK A. VEITH, a citizen of the United States, residing at Erie, in the county of Erie and State of Pennsylvania, have invented new and useful Improvements in Drill Devices, of which the following is a specification.

It is desirable to provide a drill chuck with means by which the drill may be positively driven, accurately centered and readily changed. My invention accomplishes these objects. In carrying it out I provide a collet which is locked in the chuck socket by a key device, the key device being locked by a cam sleeve. The sleeve is conveniently locked against removal from the chuck. It is also desirable to yieldingly hold this sleeve in locking position so that the drill chuck may be inverted without a disengaging movement of the sleeve.

The invention is illustrated in the accompanying drawings as follows:—

Figure 1:
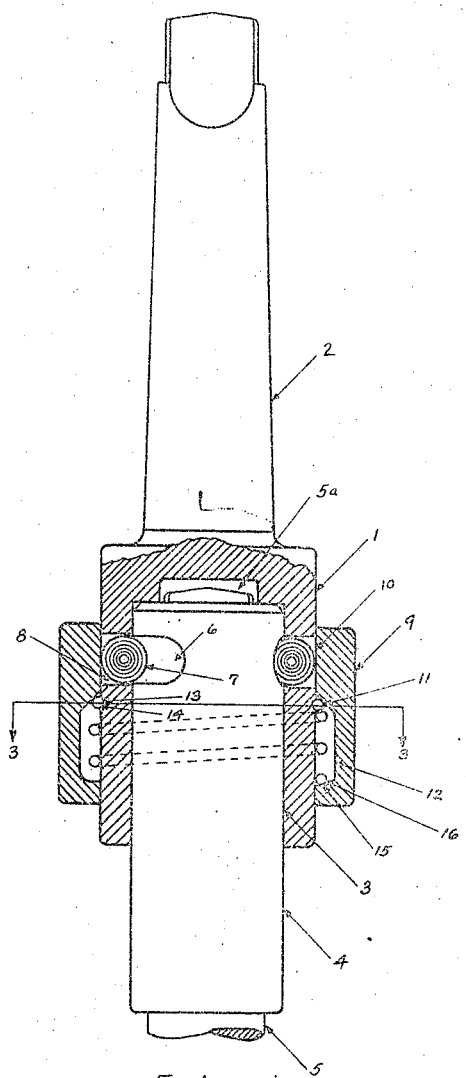
Figure 3:
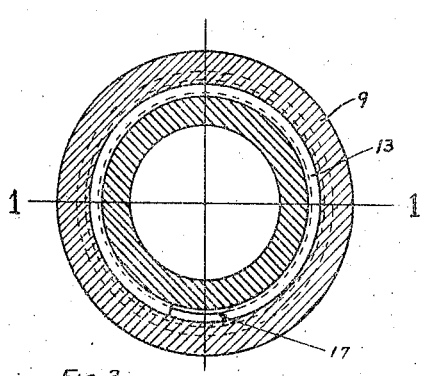

Fig. 1 shows a drill chuck, partly in section, on the line 1—1 in Fig. 3.

Figure 2:
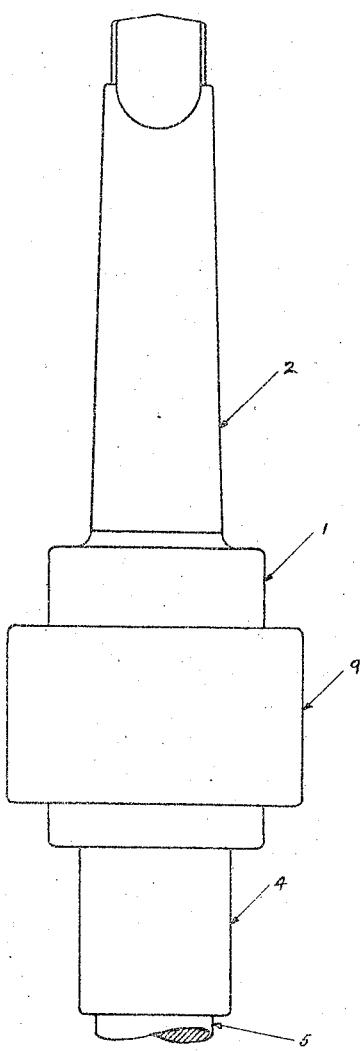

Fig. 2 a side elevation of the chuck.

Fig. 3 a section on the line 3—3 in Fig. 1.

1 marks the chuck, 2 the chuck shank, 3 the chuck socket, 4 a collet arranged to operate in the chuck socket, 5 a drill arranged in the collet, 5ᵃ a tang of the drill extending through the end of the collet, 6 a ball socket arranged in the collet, and 7 a ball arranged in a perforation 8 in the walls of the chuck, the perforation having the usual reduced diameter at its inner end to retain the ball when the collet is removed.

A locking sleeve 9 is slidingly mounted on the outer surface of the chuck. It has a locking surface 10 which is practically the same diameter as the outer surface of the chuck and which is adapted to hold the balls in the inward or locking position in the ball socket 6. The sleeve is provided with a cam 11 which operates to force the balls inwardly when the sleeve is moved axially and is also provided with the recess having the outer surface 12 which permits the balls to move outwardly sufficiently to release the collet.

A snap ring 13 is arranged in a groove 14 on the outer surface of the chuck. This snap ring forms a locking device which prevents the sleeve from slipping off the chuck. It engages the cam surface 11 at one end of the recess and a shoulder 15 at the opposite end. In this way the locking device is entirely housed by the sleeve. It can be very readily assembled and conveniently accomplishes the purpose.

I prefer to provide a spring 16 which is also housed in the recess and tends to hold the sleeve with the cam surface 11 in engagement with the ring, in other words, hold the sleeve in position to hold the balls in locking position. This spring is preferably formed integrally with the snap ring 13 being formed simply in continuation of it, the end of the ring having a slight off-set 17 to carry it out of the groove 14 and it is then continued with a winding having a coil spring pitch.

What I claim as new is:—

1. In a drill device, the combination of a chuck having a tool socket and a snap ring groove in its outer surface; a key device operating through the wall of the chuck; an operating sleeve slidingly mounted on the chuck and having a locking surface operating on the key device; a cam operating on the key device and an annular recess; a snap ring in the groove and recess; and a spring operating against the snap ring and a wall of the recess and yieldingly holding the sleeve in locking position, said spring being formed integrally with the snap ring.

2. In a drill device, the combination of a chuck having a tool socket and a snap ring groove on its outer surface; a key device operating through the wall of the chuck; an operating sleeve slidingly mounted on the chuck and having a cam operating on the key device and a holding surface operating on the key device, a snap ring in the groove for locking the sleeve against movement in one direction; and a spring formed integrally with the snap ring and yieldingly holding the sleeve in locking position.

In testimony whereof I have hereunto set my hand.

FRANK A. VEITH.